United States Patent [19]

Patel et al.

[11] Patent Number: 5,149,690

[45] Date of Patent: Sep. 22, 1992

[54] DRILLING FLUID ADDITIVE AND METHOD FOR INHIBITING HYDRATION

[75] Inventors: Arvind D. Patel, Houston; Henry C. McLaurine, Katy, both of Tex.

[73] Assignee: M-I Drilling Fluids Company, Houston, Tex.

[21] Appl. No.: 783,368

[22] Filed: Oct. 28, 1991

[51] Int. Cl.$^5$ ............................................. C09K 7/02
[52] U.S. Cl. ................................................... 507/131
[58] Field of Search ........................................ 507/131

[56] References Cited

U.S. PATENT DOCUMENTS

| | | | |
|---|---|---|---|
| 3,127,344 | 3/1964 | DeGroote et al. | 507/131 |
| 3,200,106 | 8/1965 | Dickson et al. | 507/131 X |
| 4,148,736 | 4/1979 | Meister | 507/131 X |

*Primary Examiner*—Robert L. Stoll
*Assistant Examiner*—Gary L. Geist
*Attorney, Agent, or Firm*—Arnold, White & Durkee

[57] ABSTRACT

This invention relates to drilling fluid additives that suppress clay swelling within a subterranean well and to methods for controlling clay swelling during the drilling of a subterranean well. Aliphatic polyamines and aliphatic acids react to form polyamides and polyamino acids that are water soluble, that have molecular weights of less than about 1000, and that have low toxicity levels. The polyamides and polyamino acids are added to water base drilling fluids which are circulated throughout a well.

When X in the acid is a hydroxyl group, the polyamide products have the following general structure:

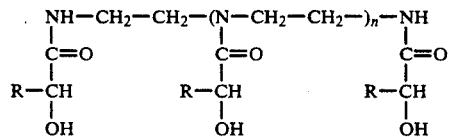

When X in the acid is a halogen such as chlorine, the polyamino acid products have the following general structure:

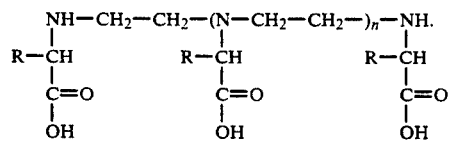

The drilling fluid additives and the method of controlling clay swelling provide for improved control of the rheological properties of drilling fluids along with an increased environmental compatibility.

12 Claims, 2 Drawing Sheets

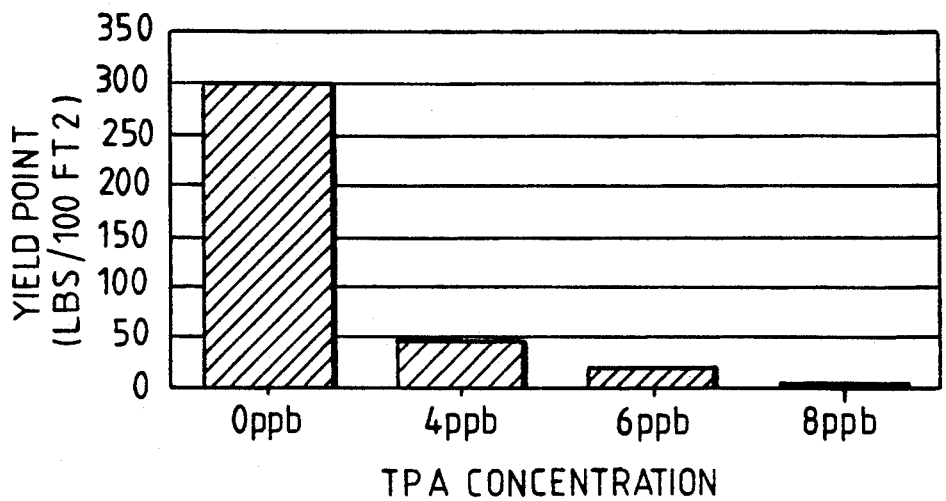
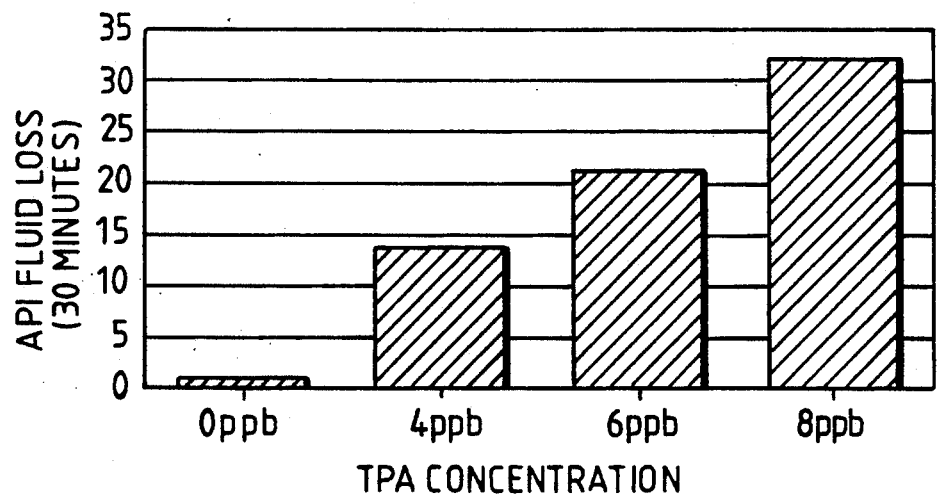

DRILLING FLUID ADDITIVE AND METHOD FOR INHIBITING HYDRATION

BACKGROUND OF THE INVENTION

The invention relates to drilling fluid additives which suppress clay swelling within a subterranean well The invention is particularly concerned with more environmentally acceptable drilling fluid additives which are aliphatic polyamides or polyamino acids having molecular weights of less than about 1000 and displaying such functional characteristics as temperature stability, low toxicity, hydration suppression, etc. The polyamides and polyamino acids are derived from the reaction of aliphatic polyamines and aliphatic acids The invention further relates to methods for controlling clay swelling during the drilling of subterranean wells by adding a functionally effective amount of these polyamides and polyamino acids to a drilling fluid and circulating the drilling fluid within a subterranean well.

In rotary drilling of subterranean wells numerous functions and characteristics are expected of a drilling fluid. A drilling fluid should circulate throughout the well and carry cuttings from beneath the bit, transport the cuttings up the annulus, and allow their separation at the surface. At the same time, the drilling fluid is expected to cool and clean the drill bit, reduce friction between the drill string and the sides of the hole, and maintain stability in the borehole's uncased sections. The drilling fluid should also form a thin, low permeability filter cake that seals openings in formations penetrated by the bit and acts to reduce the unwanted influx of formation fluids from permeable rocks.

Drilling fluids are typically classified according to their base material. In oil base fluids, solid particles are suspended in oil, and water or brine may be emulsified with the oil. The oil is typically the continuous phase. In water base fluids, solid particles are suspended in water or brine, and oil may be emulsified in the water. The water is typically the continuous phase. Pneumatic fluids are a third class of drilling fluids in which a high velocity stream of air or natural gas removes drill cuttings.

Three types of solids are usually found in water base drilling fluids 1) clays and organic colloids added to provide necessary viscosity and filtration properties; 2) heavy minerals whose function is to increase the drilling fluid's density; and 3) formation solids that become dispersed in the drilling fluid during the drilling operation.

The formation solids that become dispersed in a drilling fluid are typically the cuttings produced by the drill bit's action and the solids produced by borehole instability. Where the formation solids are clay minerals that swell, the presence of either type of formation solids in the drilling fluid can greatly increase drilling time and costs.

Clay minerals are crystalline in nature. The structure of a clay's crystals determines its properties. Typically, clays have a flaky, mica-type structure. Clay flakes are made up of a number of crystal platelets stacked face-to-face. Each platelet is called a unit layer, and the surfaces of the unit layer are called basal surfaces.

A unit layer is composed of multiple sheets. One sheet is called the octahedral sheet; it is composed of either aluminum or magnesium atoms octahedrally coordinated with the oxygen atoms of hydroxyls. Another sheet is called the tetrahedral sheet. The tetrahedral sheet consists of silicon atoms tetrahedrally coordinated with oxygen atoms.

Sheets within a unit layer link together by sharing oxygen atoms. When this linking occurs between one octahedral and one tetrahedral sheet, one basal surface consists of exposed oxygen atoms while the other basal surface has exposed hydroxyls. It is also quite common for two tetrahedral sheets to bond with one octahedral sheet by sharing oxygen atoms. The resulting structure, known as the Hoffman structure, has an octahedral sheet that is sandwiched between the two tetrahedral sheets. As a result, both basal surfaces in a Hoffman structure are composed of exposed oxygen atoms.

The unit layers stack together face-to-face and are held in place by weak attractive forces. The distance between corresponding planes in adjacent unit layers is called the c-spacing. A clay crystal structure with a unit layer consisting of three sheets typically has a c-spacing of about $9.5 \times 10^{-7}$ mm.

In clay mineral crystals, atoms having different valences commonly will be positioned within the sheets of the structure to create a negative potential at the crystal surface. In that case, a cation is adsorbed on the surface. These adsorbed cations are called exchangeable cations because they may trade places with other cations when the clay crystal is in water. In addition, ions may also be adsorbed on the clay crystal edges and exchange with other ions in the water.

The type of substitutions occurring within the clay crystal structure and the exchangeable cations adsorbed on the crystal surface greatly affect clay swelling, a property of primary importance in the drilling fluid industry. Clay swelling is a phenomenon in which water molecules surround a clay crystal structure and position themselves to increase the structure's c-spacing. Two types of swelling may occur.

Surface hydration is one type of swelling in which water molecules are adsorbed on crystal surfaces. Hydrogen bonding holds a layer of water molecules to the oxygen atoms exposed on the crystal surfaces. Subsequent layers of water molecules then line up to form a quasi-crystalline structure between unit layers which results in an increased c-spacing. All types of clays swell in this manner.

Osmotic swelling is a second type of swelling. Where the concentration of cations between unit layers in a clay mineral is higher than the cation concentration in the surrounding water, water is drawn between the unit layers and the c-spacing is increased. Osmotic swelling results in larger overall volume increases than surface hydration. However, only certain clays, like sodium montmorillonite, swell in this manner.

Exchangeable cations found in clay minerals greatly impact the amount of swelling that takes place. The exchangeable cations compete with water molecules for the available reactive sites in the clay structure. Cations with high valences are more strongly adsorbed than ones with low valences. Thus, clays with low valence exchangeable cations will swell more than clays whose exchangeable cations have high valences.

In the North Sea and the United States Gulf Coast, drillers commonly encounter argillaceous sediments in which the predominant clay mineral is sodium montmorillonite (commonly called "gumbo shale"). Sodium cations are the exchangeable cations in gumbo shale. As the sodium cation has a low valence, it easily disperses into water. Consequently, gumbo shale is notorious for its swelling.

Clay swelling during the drilling of a subterranean well has a tremendous adverse impact on drilling operations. The overall increase in bulk volume accompanying clay swelling impedes removal of cuttings from beneath the drill bit, increases friction between the drill string and the sides of the borehole, and inhibits formation of the thin 15 filter cake that seals formations. Clay swelling can also create other drilling problems such as loss of circulation or stuck pipe that slow drilling and increase drilling costs. Thus, given the frequency in which gumbo shale is encountered in drilling subterranean wells, the development of a substance and method for reducing clay swelling has long been a goal of the oil and ga exploration industry.

One method to reduce clay swelling is to use salts in drilling fluids. Salts generally reduce the swelling of clays. However, salts flocculate the clays resulting in both high fluid losses and an almost complete loss of thixotropy. Further, increasing salinity often decreases the functional characteristics of drilling fluid additives.

Another method for controlling clay swelling is to use surfactants in drilling fluids. Since they are adsorbed on the surfaces of clays, added surfactants compete with water molecules for clay reactive sites and thus serve to reduce clay swelling.

Surfactants can be either cationic, anionic, or nonionic. Cationic surfactants dissociate into organic cations and inorganic anions, while anionic surfactants dissociate into inorganic cations and organic anions. Nonionic surfactants do not dissociate.

It is important that the driller of subterranean wells be able to control the rheological properties of drilling fluids by using additives, including surfactants. In the oil and gas industry today it is desirable that additives work both onshore and offshore and in fresh and salt water environments. In addition, as drilling operations impact on plant and animal life, drilling fluid additives should have low toxicity levels and should be easy to handle and to use to minimize the dangers of environmental pollution and harm to operators. Any drilling fluid additive should also provide desirable results but should not inhibit the desired performance of other additives. The development of such additives will help the oil and gas industry to satisfy the long felt need for superior drilling fluid additives which act to control of the rheological properties of drilling fluids. The present invention addresses this need.

SUMMARY OF THE INVENTION

The present invention, in a broad aspect, comprises drilling fluid additives and systems for reducing the problems associated with clays which swell in the presence of water. The additives comprise aliphatic polyamides and polyamino acids which are water soluble, nonionic or amphoteric, have low toxicity and possess low molecular weights, preferably less than about 1000. Preferred polyamides and polyamino acids are obtained by reacting aliphatic polyamines with aliphatic acids to obtain polyamides or polyamino acids having molecular weights between about 150 and about 1,000, preferably between about 250 and 1,000.

Especially preferred polyamines comprise polyalkylene polyamines such as diethylenetriamine, triethylenetetraamine and tetraethylenepentaamine, alone or in combination with other such amines. Other amines such as polypropylene polyamines and cyclic amines such as piperazine can be included in this invention.

Especially preferred aliphatic acids comprise substituted, low molecular weight acids such as hydroxyacetic acid, chloroacetic acid, and bromoacetic acid. Related acids include substituted counterparts of such acids as propionic acid, glycolic acid and hydroxybutyric acid. The acids preferably contain two to five carbon atoms.

Preferred embodiments of the invention have been obtained by reacting polyamines characterized by the following formula:

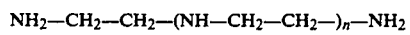

$NH_2-CH_2-CH_2-(NH-CH_2-CH_2-)_n-NH_2$ where n has a value of 0 to 8, with a substituted alkanoic acid characterized by the following formula:

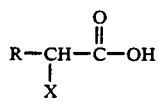

where R is hydrogen or an alkyl radical of the formula $C_nH_{2n+1}$, where n is from 1 to 4, and X is a hydroxyl group or a halogen selected from the group consisting of chlorine, bromine, iodine or combinations thereof.

When X in the acid is a hydroxyl group, the polyamide products have the following general structure:

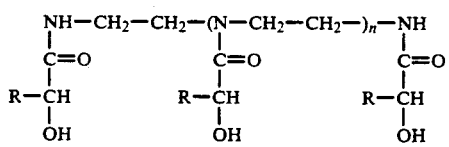

When X in the acid is a halogen such as chlorine, the polyamino acid products have the following general structure:

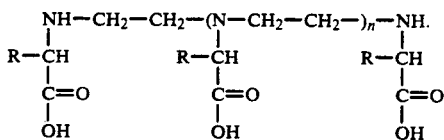

The foregoing effective polyamides may be formed by heating the polyamine and hydroxy acid reactants to a temperature up to about 200° C.(400° F.), preferably between about 95° C.(200° F.) and 200° C.(400° F.). The polyamine and halogen acid reactants are heated up to about 190° C.(300° F.), and preferably between about 25° C.(75° F.) and 190° C.(300° F.).

The amido and amino acid additives of the present invention are added to a drilling fluid in concentrations sufficient to deal with the clay swelling problems at hand. Concentrations between about 0.25 pounds per barrel (ppb) and 25 ppb are generally contemplated and are considered to be functionally effective.

The additives of the invention are selected to be stable in the presence of multivalent ions such as calcium and magnesium; however, it is generally preferred that ions be held to low levels. It is also preferred that heavy metal ions such as chromium be avoided to minimize toxicity problems. The present additives are especially desirable in that respect.

The improved drilling fluid of this invention exhibits improved functional characteristics and environmental compatibility in comparison to conventional water base drilling fluids. Specifically, the circulation within a subterranean well of the drilling fluid of this invention as compared to conventional drilling fluids is characterized by improved toxicity characteristics and improved control of filter cake formation, borehole stability, cuttings removal, and other such drilling concerns.

It is essential that the drilling fluid ultimately selected and formulated for use in any particular well application be balanced to the conditions of the well. Therefore, although the base ingredients remain the same, i.e., salt or fresh water and the drilling fluid additives of this invention, other components can be added.

For purposes of understanding the terms "yield point" and "fluid loss" which appear in the figures and which are sometimes used in describing the results of experimentation, yield point and fluid loss within the context of this application are variables used in the determination of viscosity characteristics of drilling fluids.

BRIEF DESCRIPTION OF THE DRAWINGS

The drawings are supplied to illustrate the functional characteristics of the drilling fluid additives of this invention. Specifically, the data represented in FIGS. 1–4 were derived from testing conducted using TPA, one drilling fluid additive of this invention which is an amide obtained by reacting hydroxyacetic acid and tetraethylenepentaamine.

FIG. 1 is a graphic representation of yield point for a non-saline aqueous drilling fluid system containing various concentrations of TPA.

FIG. 2 is a graphic representation of fluid loss for a non-saline aqueous drilling fluid system containing various concentrations of TPA.

DETAILED DESCRIPTION OF THE INVENTION

Figure 3:
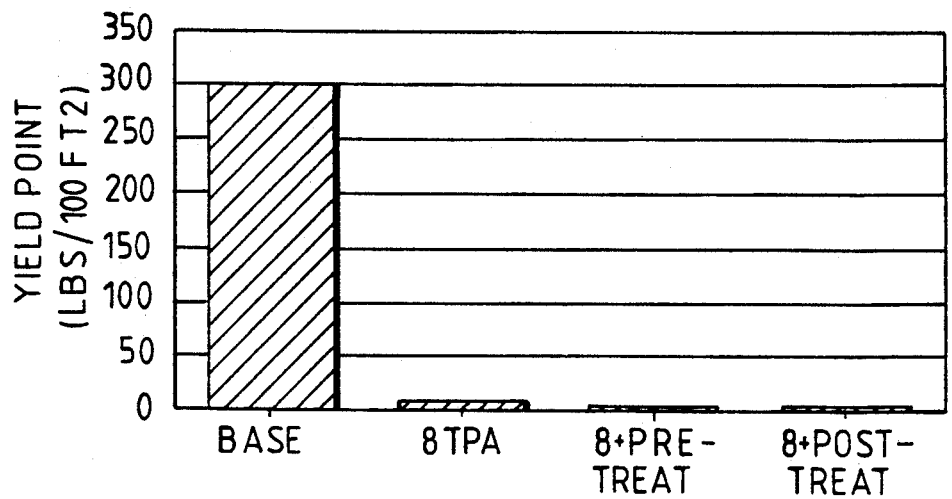
FIG. 3 is a graphic representation of yield point for a non-saline aqueous drilling fluid system containing various concentrations of gypsum ($CaSO_4$) and TPA.

In a preferred embodiment of this invention, hydroxyacetic acid (70%) and tetraethylenepentaamine were combined with agitation at a rate required to maintain the reaction temperature at about 200° F. The combination then was mixed for about 15 minutes at about 200° F. Subsequently, the reactor was heated to approximately 310° F. at a rate of about 1° F. per minute and held at about that temperature until the reaction of the amine and acid was completed to form the polyamide of this invention.

Once the reaction was completed, the reactor was cooled to about 150° F. Potassium hydroxide (50%) was then charged to adjust the pH to about 7.0. Water next was charged to dilute the product to about 50% active material. The reactor finally was cooled and the product was packaged.

The product obtained, referred to as TPA, was an amide having the following structure and properties:

$$\begin{array}{ccc}
NH-CH_2-CH_2-(N-CH_2-CH_2)_3-NH \\
| & | & | \\
C=O & C=O & C=O \\
| & | & | \\
CH_2 & CH_2 & CH_2 \\
| & | & | \\
OH & OH & OH
\end{array}$$

| Physical Properties: | TPA |
|---|---|
| Specific Gravity | 1.2 |
| Flash Point | >200° F. |
| Water Solubility | Complete |

For purposes of understanding the term "TPA" within the context of this application, "TPA" is a term commonly used by M-I Drilling Fluids Company to refer to the amide having the above structure and properties.

In alternate embodiments of this invention, an improved drilling fluid additive can be formed by separately reacting any one of the following hydroxyalkanoic acid/polyethylenepolyamine pairs:
hydroxyacetic acid and diethylenetriamine; or
hydroxyacetic acid and triethylenetetraamine.

In another preferred embodiment of this invention, chloroacetic acid and diethylenetriamine were combined with agitation at a rate required to maintain the reaction temperature below 200° F. The combination was mixed until the reaction of diethylenetriamine and chloroacetic acid was completed. Once the reaction was complete, the reactor was cooled to about 150° F. Potassium hydroxide (50%) then was charged to adjust the pH to approximately 7.0. Water next was charged to dilute the product to about 35% active material. The reactor finally was cooled and the product was packaged.

The product obtained, referred to as TPA-M, was a polyamino acid having the following structure and properties:

$$\begin{array}{ccc}
NH-CH_2-CH_2-N-CH_2-CH_2-NH \\
| & | & | \\
CH_2 & CH_2 & CH_2 \\
| & | & | \quad + 3KCl \\
C=O & C=O & C=O \\
| & | & | \\
OK & OK & OK
\end{array}$$

| Physical Properties: | TPA-M |
|---|---|
| Specific Gravity | 1.2 |
| Flash Point | >200° F. |
| Water Solubility | Complete |

For purposes of understanding the term "TPA-M" within the context of this application, "TPA-M" is a term commonly used by M-I Drilling Fluids Company to refer to the polyamino acid having the above structure and properties.

In alternate embodiments of this invention, an improved drilling fluid additive can be formed by separately reacting any one of the following chloroacetic acid/polyethylenepolyamine pairs:
chloroacetic acid and triethylenetetraamine; and
chloroacetic acid and tetraethylenepentaamine.

A variety of materials can be included in the water base drilling fluid of this invention. The polyamides and polyamino acids of this invention are compatible with most commonly encountered materials. A water base drilling fluid of this invention will typically be optimized where the polyamides and polyamino acids are used in conjunction with other drilling fluid additives.

Specifically, materials generically referred to as gelling materials, thinners, fluid loss control agents, and weight materials are typically added to water base drilling fluid formulations. Of these additional materials each can be added to the formulation in a concentration as rheologically and functionally required by drilling conditions. Typical of gel materials used in aqueous based drilling fluids are high molecular weight polymers such as PHPA, bentonite and salt gel.

Similarly, it has been found beneficial to add lignosulfonates as thinners for water base drilling fluids. Typically lignosulfonates, modified lignosulfonates, polyphosphates and tannins are added. In other embodiments low molecular weight polyacrylates can also be added as thinners. Thinners are added to a drilling fluid to reduce flow resistance and gel development. Other functions performed by thinners include to reduce filtration and cake thickness, to counteract the effects of salts, to minimize the effects of water on the formations drilled, to emulsify oil in water, and to stabilize mud properties at elevated temperatures.

In addition, the drilling fluid composition of this invention may optionally contain a weight material. The quantity depends upon the desired density of the final composition. The preferred weight materials include, but are not limited to, barite, iron oxide, calcium carbonate and the like.

Finally, fluid loss control agents such as modified lignite, polymers and modified starches and cellulose can be added to the water base drilling fluid system of this invention.

The following examples are included to illustrate the performance characteristics of preferred embodiments of this invention.

EXAMPLE 1

Test results indicated that significant reductions in clay swelling can be obtained by adding TPA to drilling fluids. Various concentrations of up to 8 ppb of TPA were added to non-saline aqueous systems consisting of 331 cubic centimeters (cc) water and 50 grams (gm) bentonite aged 16 hours at 150° F. (rolling). As shown in FIG. 1, significantly lower yield points were noted in the tests where TPA was added to the systems than in tests of systems to which no TPA was added. Further, major increases in fluid loss occurred in the systems with TPA as compared to the systems without TPA. This result is demonstrated in FIG. 2. Given that yield points will decrease and fluid loss will increase as clay swelling is reduced, the test results showed TPA's effectiveness in reducing clay swelling in non-saline aqueous systems.

EXAMPLE 2

A simple TPA, gel, and water system of 6 gm TPA, 331 cc water, and 50 gm bentonite aged 16 hours at 150° F. (rolling) was tested. Although TPA is optimized in systems incorporating other common drilling fluid additives, comparing the yield point in this simple system with the base yield point for a system containing no TPA demonstrated that even a simple TPA system results in dramatic reductions in clay swelling.

EXAMPLE 3

To test the effectiveness of TPA's use with prehydrated bentonite, a system aged 16 hours at 150° F. (rolling) of 30 gm bentonite and 338.5 cc water was pre- and post-treated with 6 gm TPA. Where TPA was added to the system before the non-hydrated bentonite, the TPA inhibited the hydration of the bentonite. However, where TPA was added to the system after previously added bentonite had hydrated, the TPA had no effect on the hydrated bentonite.

Because salts affect both hydrated and non-hydrated clays, the use of salts in drilling fluids reduces the effectiveness of the use of pre-hydrated bentonite to control fluid loss or filter cake formation. Thus, the test results demonstrated TPA's superiority over salts. Since TPA affects only non-hydrated clays, TPA's use does not reduce pre-hydrated bentonite's effectiveness.

EXAMPLE 4

To test the anionic and cationic compatibility of TPA, a system aged 16 hours at 150° F. (rolling) of 50 gm bentonite, 331 cc water and 8 gm TPA was pre- and post-treated with 3.5 gm gypsum ($CaSO_4$). As shown in FIG. 3, the yield point values observed when gypsum was added were lower than the yield point values observed in trials without gypsum. Further, as compared to the yield point of the base system containing no TPA or gypsum, significantly lower yield points were observed where either pre- or post-treatment with gypsum occurred.

These results demonstrated that enhanced reductions in both hydration and dispersion effects can be achieved with systems that utilize both a divalent cation and TPA. Further, the tests demonstrated TPA's compatibility with calcium cations, thus showing TPA's effectiveness in a divalent ion environment.

EXAMPLE 5

To test the performance of TPA in a sea water environment, sea water aqueous systems of 302 cc sea water and 125 gm bentonite aged 16 hours at 150° F. (rolling) were tested with various concentrations of TPA.

Figure 4:
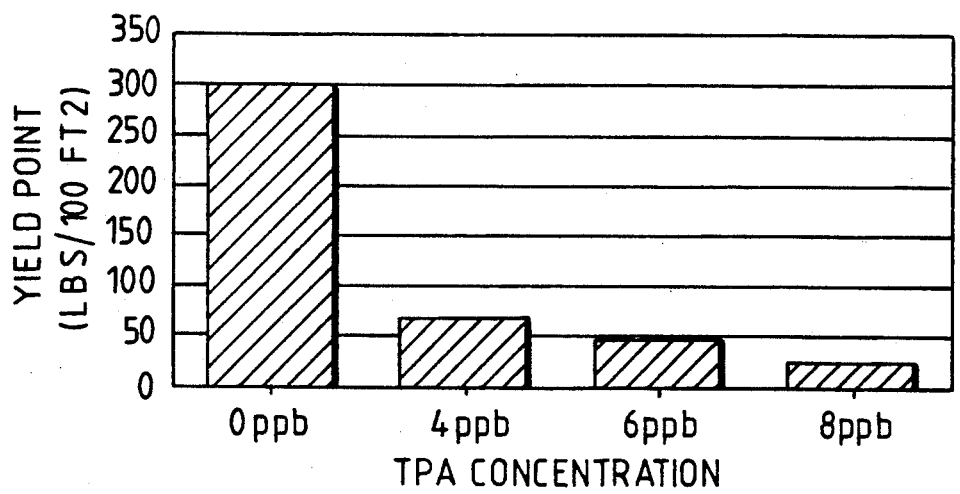
FIG. 4 is a graphic representation of yield point for a sea water aqueous drilling fluid system containing various concentrations of TPA.

As shown in FIG. 4, test results indicated that yield points decreased as the concentration of TPA increased from 0 to 8 ppb. Consequently, the results demonstrated that TPA performs well in a sea water environment and that the combination of sea water and TPA has an extremely high tolerance of low gravity solids (i.e. a high yielding smectite bentonite or "gumbo").

EXAMPLE 6

To test the cation and alkaline tolerances of TPA in a sea water environment, various combinations of concentrations of TPA, lime, and chrome-free lignosulfonate were added to a sea water aqueous system of 312 cc sea water and 100 gm bentonite aged 16 hours at 150° F. (rolling).

While 5 ppb lime flocculated a bentonite slurry containing no TPA, the results showed that when 5 ppb lime is added to a pre-treated sample of TPA and bentonite, only minimal effects are observed. Further, the addition of a dispersant such as chrome-free lignosulfonate virtually depleted the remaining viscosity. Thus, the results further demonstrated that TPA is compatible with sea water and other additives and that TPA's performance is optimized in systems incorporating other drilling fluid additives.

EXAMPLE 7

Testing was conducted to assess the toxicity levels associated with using TPA. The United States Environmental Protection Agency has specified a Mysid shrimp bioassay as the means for assessing marine aquatic toxicity of drilling fluids. A detailed account of the procedure for measuring toxicity of drilling fluids is described in Duke, T. W., Parrish, P. R.; "Acute Toxicity of Eight Laboratory Prepared Generic Drilling Fluids to Mysids (Mysidopsis)" 1984 EPA-600/3-84-067. Such report is hereby incorporated by reference.

For purposes of understanding the term "minimal toxicity" within the context of this application, it refers to an $LC_{50}$ of greater than 30,000. Although 30,000 has been the number used for purposes of evaluation it should not be considered a limitation on the scope of this invention. Other $LC_{50}$ values may be viable in various environmental settings. An $LC_{50}$ value of greater than 30,000 has been equated to an "environmentally compatible" product.

To demonstrate the minimal toxicity of TPA, 48 and 96-hour $LC_{50}$ toxicity studies were conducted. The 48-hour $LC_{50}$ of a non-saline system containing 8 ppb TPA, 10 ppb bentonite and 3 ppb of Therm Pac U.L. was 720,000. The 96-hour $LC_{50}$ of a divalent, high salinity, polymer-based system containing 8 ppb TPA exceeded 480,000. Both $LC_{50}$ levels are outstanding compared to currant market standards. Thus, these results show that TPA is environmentally acceptable with toxicity levels superior to those of the prior art.

EXAMPLE 8

Results of tests using a 6 ppb concentration of TPA show that TPA's temperature stability is in excess of 300° F. The system tested was viscosified by 0.6 ppb of a high temperature polymer and 5 ppb of pre-hydrated bentonite. For contamination, 30 ppb of high yield clay was added. The system was aged 16 hours at 300° F. (static).

Yield point values far in excess of 23 lbs/100 ft² would be the norm for a 35 ppb gel slurry. Adding a polymer to such a fluid would exponentially increase viscosity. Yet, the testing using TPA produced yield point values below 23 lbs/100 ft². Thus, TPA provided manageable control of rheological and thixotropic properties while exhibiting excellent temperature stability.

EXAMPLE 9

Test results indicated that significant reductions in clay swelling also may be obtained by adding TPA-M to drilling fluids. Concentrations of up to 8 ppb of TPA-M were added to non-saline aqueous systems of 290.5 cc water, 10 gm bentonite aged 16 hours at 150° F. (rolling), and up to 1 ppb of PHPA, a high molecular weight polymer commonly included in drilling fluids. As shown in Table I, significantly lower yield points were noted for the systems where TPA-M was added than in the systems without TPA-M. Thus, the results show TPA-M's effectiveness in reducing clay swelling.

TABLE I

| Yield Point Comparison Non-Saline Aqueous System | | |
|---|---|---|
| TPA-M Concentration (ppb) | PHPA Concentration (ppb) | Yield Point (lbs/100 ft²) |
| 0 | 1.0 | 104 |
| 4 | 0.5 | 5 |
| 4 | 1.0 | 17 |
| 6 | 1.0 | 9 |

Water 290.5 cc
Bentonite 10 gm
Aged 16 hours @ 150° F. (rolling)

Although the preferred embodiment of this invention has been described hereinabove in some detail, it should be appreciated that a variety of embodiments will be readily available to a person utilizing such drilling fluid additives for a specific end use. The description of the composition and method of this invention is not intended to be limiting on this invention, but is merely illustrative of the preferred embodiment of this invention. Other drilling fluid additives and methods of suppressing clay hydration which incorporate modifications or changes to that which has been described herein are equally included within this application.

What is claimed is:

1. A water base drilling fluid containing a functionally effective concentration of the reaction product of an aliphatic polyamine with an aliphatic acid of the formula:

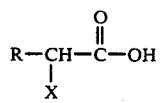

where R is hydrogen or an alkyl group having up to four carbon atoms, and X is a hydroxyl or a halogen selected from the group consisting of chlorine, bromine, iodine, or combinations thereof and the water soluble reaction product has a molecular weight up to about 1,000 sufficient to reduce the swelling of a clay which swells in the presence of water.

2. The drilling fluid of claim 11, in which the reaction product is a polyamide.

3. The drilling fluid of claim 11, in which the reaction product is a polyamino acid.

4. A method of reducing the swelling clay in a well in the presence of water which comprises circulating in the well a water base drilling fluid containing a functionally effective concentration of the water soluble reaction product formed by reacting an aliphatic polyamine with an aliphatic acid of the formula:

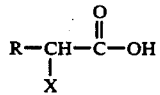

where R is hydrogen or an alkyl group having up to four carbon atoms, and X is a hydroxyl or a halogen selected from the group consisting of chlorine, bromine, iodine, or combinations thereof, and the water soluble reaction product has a molecular weight up to about 1,000, which is sufficient to reduce swelling of the clay.

5. A method for controlling hydration in the drilling of subterranean wells comprising adding a functionally effective amount of a polyamide to a drilling fluid, said polyamide comprising the reaction product of diethylenetriamine and hydroxyacetic acid, and injecting said drilling fluid into a subterranean well.

6. The method of claim 5 wherein said polyamine is selected from the group consisting of: diethylenetriamine, triethylenetetraamine, tetraethylenepentaamine and combinations thereof.

7. The method of claim 5 wherein said polyamide is triamide.

8. A method for controlling hydration in the drilling of subterranean wells comprising adding a functionally effective amount of a triamide having a molecular weight of less than 1000 to a drilling fluid, said polyamide comprising the reaction product of diethylenetriamine and hydroxyacetic acid, and injecting said drilling fluid into a subterranean well.

9. A method for controlling hydration in the drilling of subterranean wells comprising adding a functionally effective amount of a polyamino acid to a drilling fluid, said polyamino acid comprising the reaction product of a polyamine and chloroacetic acid, and injecting said drilling fluid into a subterranean well.

10. The method of claim 9 wherein said polyamine is selected from the group consisting of: diethylenetriamine, triethylenetetraamine, tetraethylenepentaamine and combinations thereof.

11. The method of claim 9 wherein said polyamino acid is a triamino acid.

12. A method for controlling hydration in the drilling of subterranean wells comprising adding a functionally effective amount of a triamino acid having a molecular weight of less than 1000 to a drilling fluid, said triamino acid comprising the reaction product of diethylenetriamine and chloroacetic acid, and injecting said drilling fluid into a subterranean well.

* * * * *

UNITED STATES PATENT AND TRADEMARK OFFICE
CERTIFICATE OF CORRECTION

PATENT NO. : 5,149,690

DATED : September 22, 1992

INVENTOR(S) : Arvind D. Patel
Henry C. McLaurine

It is certified that error appears in the above-identified patent and that said Letters Patent is hereby corrected as shown below:

In claim 1, at col. 10, line 37, insert --,-- immediately after "thereof".

In claim 1, at col. 10, line 39, insert --,-- immediately after "1,000".

In claim 2, at col. 10, line 41, delete the number "11" and insert --1-- in its place.

In claim 3, at col. 10, line 43, delete the number "11" and insert --1-- in its place.

In claim 4, at col. 10, line 45, insert --of-- between the words "swelling" and "clay".

Signed and Sealed this

Fourteenth Day of September, 1993

Attest:

BRUCE LEHMAN

Attesting Officer    Commissioner of Patents and Trademarks